J. G. VINCENT.
HYDROCARBON MOTOR.
APPLICATION FILED FEB. 7, 1920.
1,415,067.
Patented May 9, 1922.
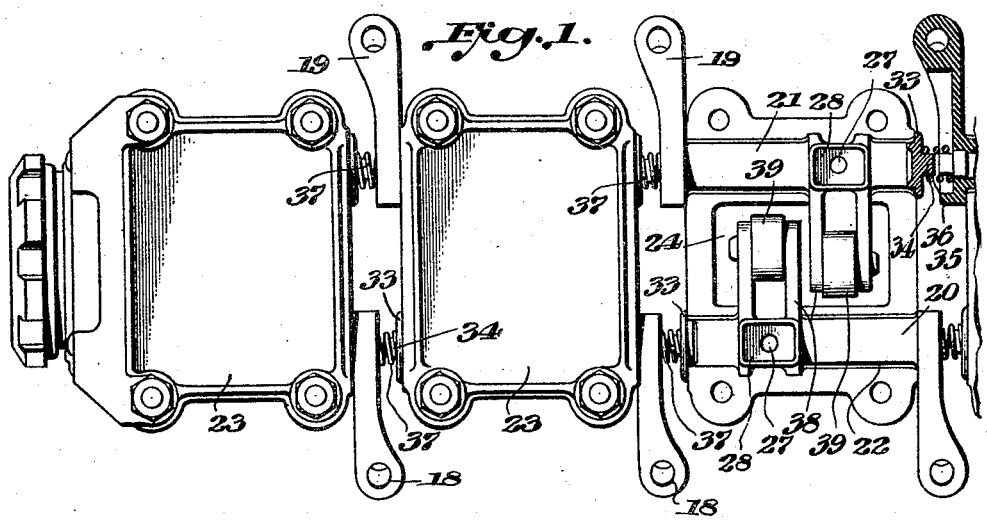
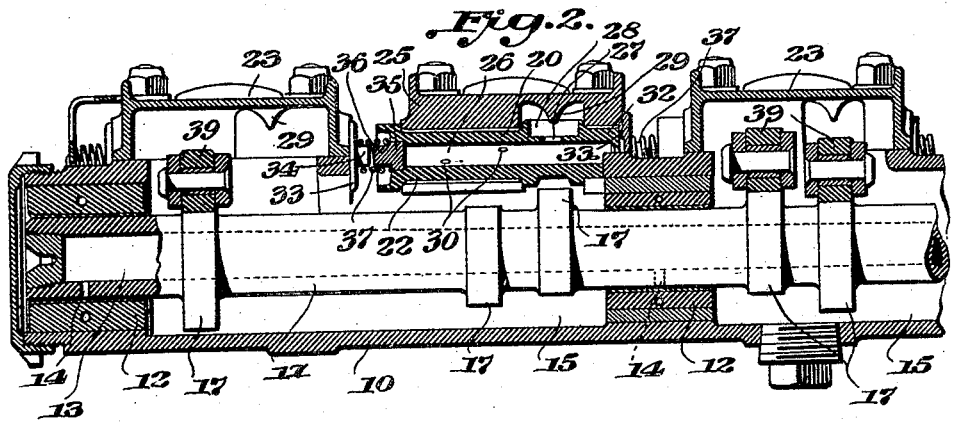
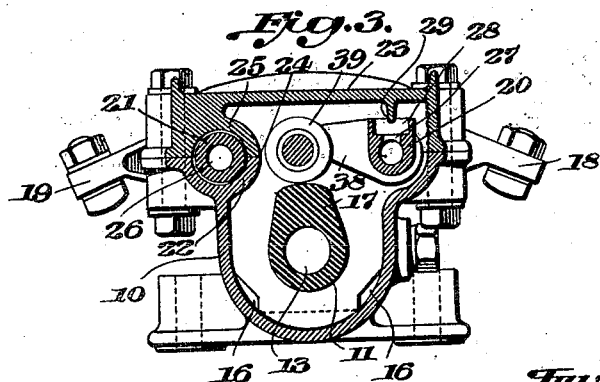
Inventor,
Jesse G. Vincent,
By Milton Tibbetts, Atty.

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

HYDROCARBON MOTOR.

1,415,067. Specification of Letters Patent. Patented May 9, 1922.

Application filed February 7, 1920. Serial No. 357,023.

*To all whom it may concern:*

Be it known that I, JESSE G. VINCENT, a citizen of the United States, and resident of Detroit, Wayne County, State of Michigan, have invented certain new and useful Improvements in Hydrocarbon Motors, of which the following is a specification.

This invention relates to hydrocarbon motors and more particularly to a valve operating mechanism and to the lubrication of such mechanism.

One of the objects of the invention is to provide means for preventing the escape of oil from the bearings of the valve operating mechanism.

Another object is to provide sealing means for the bearings of the valve operating mechanism or rock shafts, so constructed that the wear between the cooperating parts will be automatically compensated for, thereby always maintaining an effective seal.

Other objects will appear from the following description taken in connection with the drawings appended hereto and in which:

Figure 1 is a plan view of a portion of the cam shaft housing of a hydrocarbon motor, partly broken away and partly in section, showing the rock shaft mounting constructed in accordance with my invention;

Figure 2 is a longitudnal section of the construction shown in Figure 1, and

Figure 3 is an end view of the construction shown in Figure 2.

The invention has been illustrated in connection with valve operating mechanism designed for use with the overhead valve type of motor, but it should be understood that it is not the intention to limit its use to the particular type of valve operating mechanism specifically illustrated.

The valve operating mechanism is mounted in a cam shaft casing 10 and comprises a cam shaft 11 mounted in bearings 12 carried by the casing and rock shafts carrying rocker arms, the rock shafts and rocker arms being mounted in the manner hereinafter described. The cam shaft 11 is hollow, as illustrated at 13 and lubricant is fed to the interior of the cam shaft in any suitable manner and is lead through radial oil conduits 14 to the bearings 12 and thence to the compartments 15 formed by the bearings. The bearings are cut away as shown in Figure 3 at 16 to permit the oil to circulate from one compartment to another and the cams 17 dip into the oil as they revolve and splash the oil into the casing 10.

In this instance two valves are provided for each cylinder and these valves are operated by rocker arms 18, 19 carried by rock shafts 20, 21. The rock shafts for the rocker arms 18 are longitudinally alined and this is also true of the shafts for the rocker arms 19 and the shafts 20 and 21 are mounted in suitable cradles 22 formed on the upper surface of the cam shaft casing 10. The upper halves of the shafts 20 and 21 are enclosed by a cover 23 which is placed over openings 24 formed in the upper surface of the cam shaft casing 10. Channels 25 carried by the cover 23 form the upper halves of the bearings for the shaft 20 and 21. Each of the rock shafts is drilled out longitudinally to form a longitudinal bore 26 and oil is conducted to this longitudinal recess through a conduit 27 which leads from an open oil cup 28 formed in the upper surface of the shaft. Each of the covers 23 has formed therein a downwardly extending lug 29 from which the oil drips into the cup 28, this oil having been splashed into the cover 23 by the rotation of the cam shafts. Each of the rock shafts is also provided with a plurality of radial apertures 30 through which the oil is conducted to the rock shaft bearing.

The present invention, as above stated, has for its object to prevent the escape of this oil from the bearings 22, 25 of the rock shafts and this is accomplished in the following manner. Each of the rock shafts has one end 32 disposed within its bearing and spaced from the end thereof and has its other end extended through the other end of the bearing and provided with a rocker arm 18 or 19 as the case may be, these rocker arms being adapted to engage the valve stems and operate the valves of the motor.

From the showing in Figure 1 it will be seen that the rocker arm 18 carried by one end of one of the shafts will be disposed at the end of the adjacent shaft which is spaced from the end of the bearing. In order to retain these rocker arms in contact with one end of the bearing and to effectively close the opposite end of the bearing, thereby preventing the escape of oil, the open end of each of the bearings is provided with a closure member or cap 33, each cap having an outwardly extending lug 34. Each of the rocker arms has secured therein a plug 35 which is driven tightly into the open end of the rock shaft and has projecting outwardly from the rocker arm a lug 36, the latter being disposed in longitudinal alinement with the lug 34 carried by the closure member which closes the open end of the adjacent rock shaft. A coil spring 37 is positioned over the lugs 34 and 36 and forces the rocker arm 18 or 19, as the case may be, into contact with the end of the bearing for the rock shaft on which the rocker arm is carried and also forces the cap 33 into contact with the open end of the bearing for the adjacent rock shaft.

From this description it will be seen that the two adjacent ends of the successive bearings will be effectively closed by means of a single member, namely the spring 37.

The rock shafts 20 and 21 have also secured thereto within the casing 10 inwardly extending rocker arms 38 which carry rollers 39, the rollers being positioned in the path of the cams 17 carried by the cam shaft.

Although one specific embodiment of the invention has been illustrated and described, it should be understood that the invention is capable of modification and that modifications and changes may be made without departing from the spirit and scope of the invention as expressed in the following claims.

What I claim and desire to secure by Letters Patent is:

1. In a hydrocarbon motor, in combination, a casing, a bearing therein, a rock shaft mounted in said bearing, means for conducting oil to said bearing, and flexible means cooperating with said rock shaft and bearing for preventing the escape of oil from the bearing.

2. In a hydrocarbon motor, in combination, a casing, a bearing therein, a rock shaft mounted in said bearing, means for conducting oil to said bearing, and resiliently actuated means cooperating with said rock shaft and bearing for preventing the escape of oil from the bearing.

3. In a hydrocarbon motor, in combination, a casing, a bearing therein, a rock shaft mounted in said bearing and having a portion projecting from the casing, an arm carried by said projecting portion, means for conducting oil to said bearing, and means engaging the arm on said rock shaft and forcing said arm into close contact with one end of the rock shaft bearing.

4. In a hydrocarbon motor, in combination, a casing, a bearing therein, a rock shaft mounted in said bearing and having a portion projecting from the casing, an arm carried by said projecting portion, means for conducting oil to said bearing, and resilient means engaging the arm on said rock shaft and forcing said arm into close contact with one end of the rock shaft bearing.

5. In a hydrocarbon motor, in combination, a casing, a bearing therein, means for conducting oil to said bearing, a rock shaft mounted in said bearing and having a portion projecting from said bearing and casing and the other end disposed within the bearing and spaced from the end thereof, an arm carried by the projecting end of said rock shaft, a closure member carried by the open end of said bearing, and means for forcing said closure member into contact with the open end of said bearing and for forcing said arm into contact with the other end of said bearing.

6. In a hydrocarbon motor, in combination, a casing, a bearing therein, means for conducting oil to said bearing, a rock shaft mounted in said bearing, and having a portion projecting from said bearing and casing, the other end disposed within the bearing and spaced from the end thereof, an arm carried by the projecting end of said rock shaft, a closure member carried by the open end of said bearing, and resilient means for forcing said closure member into contact with the open end of said bearing and for forcing said arm into contact with the other end of said bearing.

7. In a hydrocarbon motor, a casing, bearings therein, a plurality of longitudinally alined rock shafts mounted in said bearings, means for conducting oil to said bearings, each of said rock shafts having one end projecting from one end of its bearing and the other end disposed within and spaced from the other end of its bearing, the projecting end of one rock shaft being disposed adjacent the spaced end of the adjacent rock shaft, rocker arms carried by the said projecting ends, closure members carried by the bearings at the open ends thereof, and means engaging said rocker arms and closure members for forcing said arms and members into contact with the ends of the rock shaft bearings.

8. In a hydrocarbon motor, a casing, bearings therein, a plurality of longitudinally alined rock shafts mounted in said bearings, means for conducting oil to said bearings, each of said rock shafts having one end projecting from one end of its bearing and the other end disposed within and spaced from the other end of its bearing, the projecting end of one rock shaft being disposed adjacent the spaced end of the adjacent rock shaft, rocker arms carried by the said projecting ends, closure members carried by the bearings at the open ends thereof, and single means engaging each rocker arm and the adjacent closure member for forcing said arms and members into contact with the ends of the rock shaft bearings.

9. In a hydrocarbon motor, a casing, bearings therein, a plurality of longitudinally alined rock shafts mounted in said bearings, means for conducting oil to said bearings, each of said rock shafts having one end projecting from one end of its bearing and the other end disposed within and spaced from the other end of its bearing, the projecting end of one rock shaft being disposed adjacent the spaced end of the adjacent rock shaft, rocker arms carried by the said projecting ends, closure members carried by the bearings at the open ends thereof, and single resilient means engaging each rocker arm and the adjacent closure member for forcing said arms and members into contact with the ends of the rock shaft bearings.

10. In a hydrocarbon motor, in combination, a casing, alined bearings therein, a pair of rock shafts mounted in said bearings, means for conducting oil to said bearings, and means cooperating with adjacent rock shafts and bearings for closing the ends of said bearings, thereby preventing the escape of oil therefrom.

11. In a hydrocarbon motor, in combination, a casing, alined bearings therein, rock shafts mounted in said bearings, each of said rock shafts having one end spaced from the end of said bearing and having its opposite end projecting through the other end of its bearing, the projecting end of one rock shaft being disposed adjacent the open end of the adjacent bearing, each of said rock shafts having a longitudinal bore therein, means for closing the open end of said bore, said means having an outwardly projecting portion, a closure member for the open end of each bearing having an outwardly projecting portion, and means carried by the outwardly projecting portions of said closure members and the outwardly projecting portions of the closure means for the bore for forcing the projecting end of one rock shaft into contact with the end of its bearing and the closure member of the adjacent bearing into contact with the open end of said bearing.

12. In a shaft casing, in combination, two alined and separated bearings, a shaft mounted in one of said bearings, a cap at the end of the other of said bearings, means for feeding oil to said bearings, and resilient means connecting said shaft and said cap, for the purpose described.

13. In a hydrocarbon motor, in combination, a casing having alined and separated bearings therein, a rock shaft mounted in one of said bearings and having a flange at one end, a cap over the adjacent end of the other said bearing, and a spring between said flange and said cap, for the purpose described.

In testimony whereof I affix my signature.

JESSE G. VINCENT.